United States Patent [19]

Ross, Sr. et al.

[11] Patent Number: 5,010,941
[45] Date of Patent: Apr. 30, 1991

[54] GOLF CART DROP CURTAIN

[76] Inventors: Victor Ross, Sr.; Victor Ross, Jr., both of P.O. Box 34, New Castle, Pa. 16103

[21] Appl. No.: 521,441
[22] Filed: May 10, 1990
[51] Int. Cl.⁵ .............................................. A47H 1/00
[52] U.S. Cl. ............................... 160/330; 280/DIG. 5
[58] Field of Search ...................... 160/350, 238, 370.2, 160/368.1, 354, DIG. 10; 280/DIG. 6, DIG. 5; 224/274; 206/315.4; 150/159

[56] References Cited

U.S. PATENT DOCUMENTS

| | | | |
|---|---|---|---|
| 2,299,173 | 10/1942 | Pidgeon | 160/84.1 X |
| 2,646,117 | 7/1953 | Hodgins | 160/368.1 |
| 2,717,036 | 9/1955 | Harris | 160/368.1 X |
| 3,709,553 | 1/1973 | Churchill et al. | 296/190 |
| 3,985,171 | 10/1976 | Summers et al. | 150/159 |
| 4,013,315 | 3/1977 | West | 280/DIG. 5 |
| 4,098,536 | 7/1978 | Mills | 280/DIG. 5 |
| 4,332,415 | 6/1982 | Williams | 280/DIG. 5 |
| 4,600,235 | 7/1986 | Frederick et al. | 160/368.1 X |
| 4,830,037 | 5/1989 | Held | 280/DIG. 5 |

Primary Examiner—Blair M. Johnson
Attorney, Agent, or Firm—Harpman & Harpman

[57] ABSTRACT

A golf cart curtain device to protect golf bags transported within a golf cart. The curtain device extends from the golf cart roof downwardly over the golf bags and is removably secured thereto for ease of access during play.

2 Claims, 1 Drawing Sheet

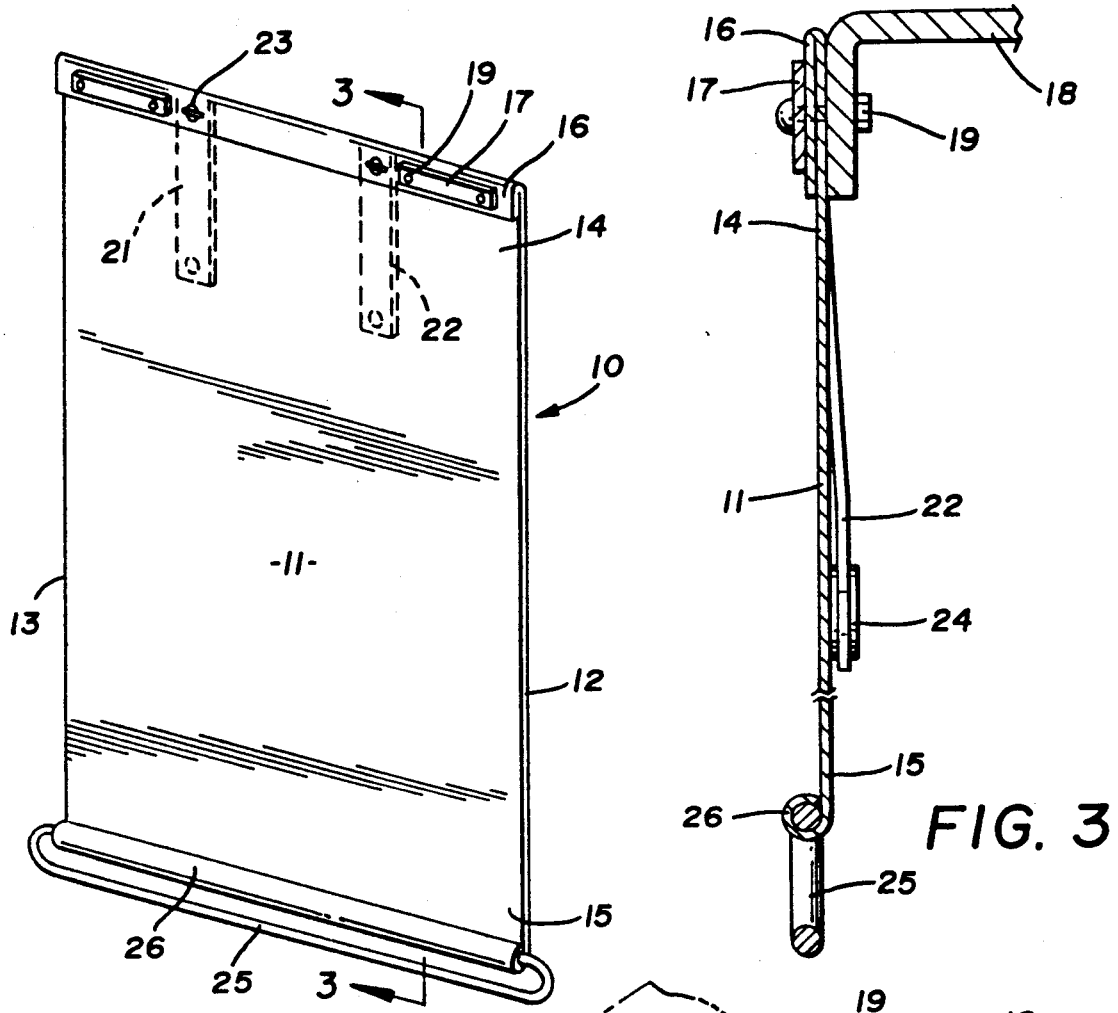
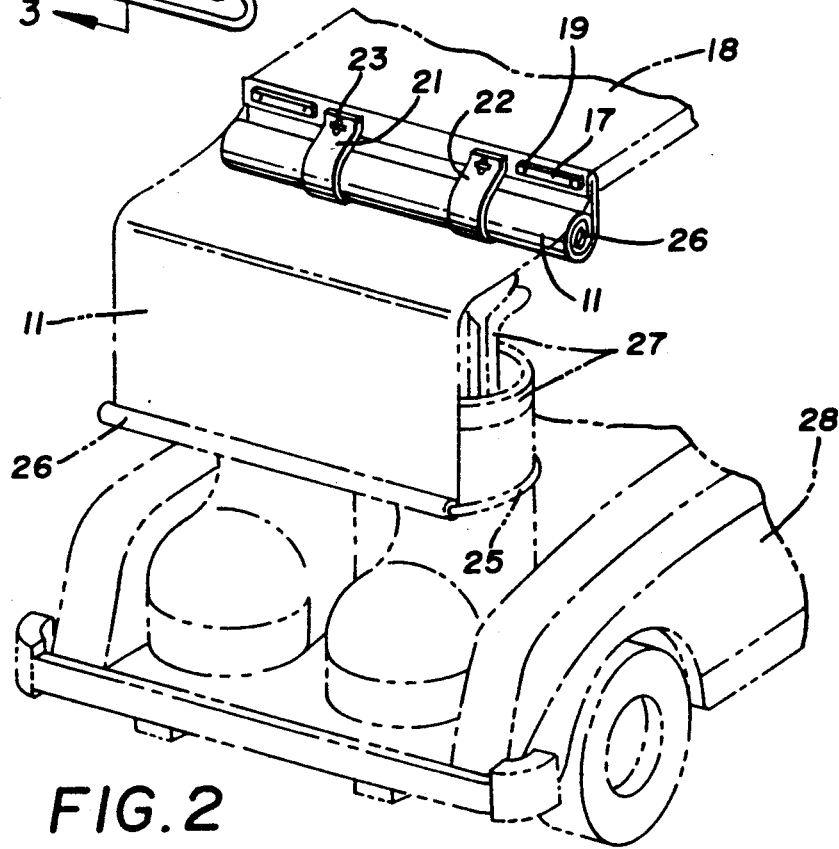
FIG. 1
FIG. 3
FIG. 2

GOLF CART CROP CURTAIN

BACKGROUND OF THE INVENTION

1. Technical Field

This invention relates to water protection devices for golf carts and associated golf bags and club transported within.

2. Description of Prior Art

Prior Art devices of this type are generally unknown.

Individual golf bags do have covers to protect the individual clubs within the bag and some golf bags have removable hoods for use during transport to and from the golf course.

Golf carts of the self-contained motorized type have a small extended rigid roof that covers the seat portion of the cart only since access and removal of the golf clubs from the bags positioned within the cart behind the passengers would prevent coverage over the bag by a rigid roof.

SUMMARY OF THE INVENTION

A golf cart drop curtain to protect golf clubs within a golf bag from the weather. The curtain device extends from the golf cart's roof and is resiliently secured to the bags within the cart. The drop curtain is of a flexible, water proof material that is selectively releaseable from the bags for access thereto.

DESCRIPTION OF THE DRAWINGS

FIG. 1 is a perspective view of the drop curtain device;

FIG. 2 is a perspective view of the drop curtain device installed on a portion of a golf cart covering the golf bags within; and FIG. 3 is a cross-sectional view on lines 3—3 of FIG. 1.

DESCRIPTION OF THE PREFERRED EMBODIMENT

A golf cart drop curtain 10 can be seen in FIGS. 1 and 2 of the drawings comprising a rectangular sheet 11 of flexible plastic resin material having oppositely disposed spaced parallel longitudinal edges 12 and 13. The rectangular sheet 11 has a top portion 14 and a bottom portion 15. Said top portion 14 is folded over upon itself forming an area of increased thickness at 16 extending transversely across said rectangular sheet 11 between said edges 12 and 13.

A pair of apertured mounting bars 17 are positioned on said area of increased thickness 18 and are used to secure the rectangular sheet 11 to a golf cart roof 11 via a plurality of fastener assemblies 19 extending through said apertured mounting bars, said area of increased thickness and through a downturned longitudinal flange 20 of the golf cart roof 18 as best seen in FIG. 3 of the drawings.

A pair of flexible straps 21 and 22 are secured at one end in spaced parallel relation to one another adjacent the mounting bar 17 on the area of increased thickness 16 by secondary fastener assembly 23. The free end of each strap has an elongated grommets 24 that is registrable over the exposed ends of secondary fastener assemblies 23A which upon half rotation lock the grommets 24 in place once the rectangular sheet 11 has been rolled up from its free end for storage as seen in FIG. 2 of the drawings in solid lines.

An elastic cord 25 (shock cord) is secured by its free ends to the rectangular sheet 11 within the end of an elongated open ended tubular member 26 formed by rolling up the bottom portion 14 of the rectangular sheet 11 and securing its free edge to the rectangular sheet 11 as will be well known and understood by those skilled in the art.

During use, the elastic cord 25 is extended around the golf bag and clubs 27 positioned within a motorized golf cart 28, a portion of which can be seen in broken lines in FIG. 2 of the drawings, holding the rectangular sheet 11 against the golf bags 27. The rectangular sheet 11 hangs down from its point of attachment to the golf cart roof 18 by hereinbefore described mounting bars 17 and fasteners 19 and drapes over the golf bags and clubs 27 providing a covering from the elements.

The rectangular sheet 11 can be rolled up for storage by its free bottom end portion and secured by the flexible straps 21 and 22 as seen in solid lines in FIG. 2 of the drawings.

It will be evident from the above description that ease of access to the golf bags and clubs 27 is possible by lifting a corner or bottom portion 14 of the rectangular sheet 11 and accessing the bags and clubs 27.

During windy and wet conditions or fast golf cart speed, the elastic cord 25 can secure the rectangular sheet 11 in down position to the golf bags and clubs 27 as hereinbefore described.

Thus it will be seen that a new and useful golf cart drop curtain has been illustrated and described and it will be apparent to those skilled in the art that various changes and modifications may be made therein without departing from the spirit of the invention, therefore I claim:

1. A golf cart drop curtain for use on golf carts to protect golf bags and golf clubs within said bags, said golf cart having a roof in spaced relation to said cart, said drop curtain comprising; a flexible sheet of non-porous material, said sheet is of a generally rectangular configuration having a top portion and a bottom portion, said top portion defining an area of increased thickness, a tubular member formed on said bottom portion of said flexible sheet by rolling said bottom portion upon itself, means for securing said top portion to said golf cart roof, an elastic cord secured by its free ends into said tubular member and extending therefrom in space parallel relation to said tubular member of said sheet.

2. The golf cart drop curtain of claim 1 wherein said means for securing said top portion to said golf cart roof comprises spaced apertured mounting bars positioned thereon by fasteners through said rectangular sheet and said golf cart roof.

* * * * *